(12) United States Patent
Demuth et al.

(10) Patent No.: US 10,898,954 B2
(45) Date of Patent: Jan. 26, 2021

(54) HEAT TREATMENT TO ANNEAL RESIDUAL STRESSES DURING ADDITIVE MANUFACTURING

(71) Applicant: Lawrence Livermore National Security, LLC, Livermore, CA (US)

(72) Inventors: James A. Demuth, Mountain View, CA (US); Andrew J. Bayramian, Manteca, CA (US); Bassem S. El-Dasher, Livermore, CA (US); Joseph C. Farmer, Tracy, CA (US); Kevin J. Kramer, Redmond, WA (US); Alexander Rubenchik, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/794,835

(22) Filed: Feb. 19, 2020

(65) Prior Publication Data

US 2020/0180029 A1 Jun. 11, 2020

Related U.S. Application Data

(62) Division of application No. 15/008,989, filed on Jan. 28, 2016, now Pat. No. 10,618,111.

(51) Int. Cl.
*B22F 3/105* (2006.01)
*B33Y 40/00* (2020.01)
(Continued)

(52) U.S. Cl.
CPC .............. *B22F 3/1055* (2013.01); *B22F 3/24* (2013.01); *B33Y 40/00* (2014.12);
(Continued)

(58) Field of Classification Search
CPC .......... B22F 3/1055; B22F 3/24; B33Y 40/00; B33Y 10/00; B33Y 30/00
See application file for complete search history.

(56) References Cited

U.S. PATENT DOCUMENTS

| 4,944,817 A | 7/1990 | Bourell et al. |
| 5,155,324 A | 10/1992 | Deckard et al. |
| (Continued) | | |

FOREIGN PATENT DOCUMENTS

| DE | 102009051551 A1 | 5/2011 |
| DE | 102010048335 A1 | 4/2012 |
| (Continued) | | |

OTHER PUBLICATIONS

Supplementary European Search Report and Written Opinion for corresponding European Patent Application No. 17 744 666.3 dated Feb. 5, 2019, 9 pages.

(Continued)

*Primary Examiner* — Jacob T Minskey
*Assistant Examiner* — Melody Tsui
(74) *Attorney, Agent, or Firm* — Harness, Dickey & Pierce, P.L.C.

(57) ABSTRACT

The present disclosure relates to a method of producing a product through additive manufacturing with heat treatment. The method involves using a fusing beam to melt powder particles disposed on a substrate, where the fusing beam is impressed with a two dimensional pattern containing image information from a first layer to be printed. The fused powder particles are then heat treated with a beam impressed with an additional two dimensional pattern. The additional two dimensional pattern has image information from the first layer to achieve heat treatment of the product. The heat treatment is completed prior to laying down additional new layers of material. The heat treatment is an annealing (Continued)

operation. The method may further involve providing a new layer of powdered material on top of the layer of fused powder particles subsequent to the heat treatment, and repeating the melting and heat treating operations in a layer-by-layer fashion using the two dimensional pattern and the additional two dimensional pattern, until the part is completed.

20 Claims, 1 Drawing Sheet

(51) Int. Cl.
*B22F 3/24* (2006.01)
*B33Y 10/00* (2015.01)
*B33Y 30/00* (2015.01)

(52) U.S. Cl.
CPC ... *B22F 2003/1056* (2013.01); *B22F 2998/10* (2013.01); *B33Y 10/00* (2014.12); *B33Y 30/00* (2014.12); *Y02P 10/25* (2015.11)

(56) References Cited

U.S. PATENT DOCUMENTS

| | | | |
|---|---|---|---|
| 2012/0132631 A1 | 5/2012 | Wescott et al. | |
| 2014/0271328 A1* | 9/2014 | Burris | B23K 26/0608 419/53 |
| 2014/0367894 A1 | 12/2014 | Kramer et al. | |
| 2015/0064048 A1 | 3/2015 | Bessac et al. | |
| 2015/0273631 A1 | 10/2015 | Kenney et al. | |

FOREIGN PATENT DOCUMENTS

| | | |
|---|---|---|
| DE | 102013205029 A1 | 9/2014 |
| EP | 0529816 A1 | 3/1993 |
| JP | 01-244609 | 9/1989 |
| WO | WO-2013140147 A1 | 9/2013 |

OTHER PUBLICATIONS

International Search Report for PCT/US17/012546, corresponding to U.S. Appl. No. 15/008,989, 14 pages.

* cited by examiner

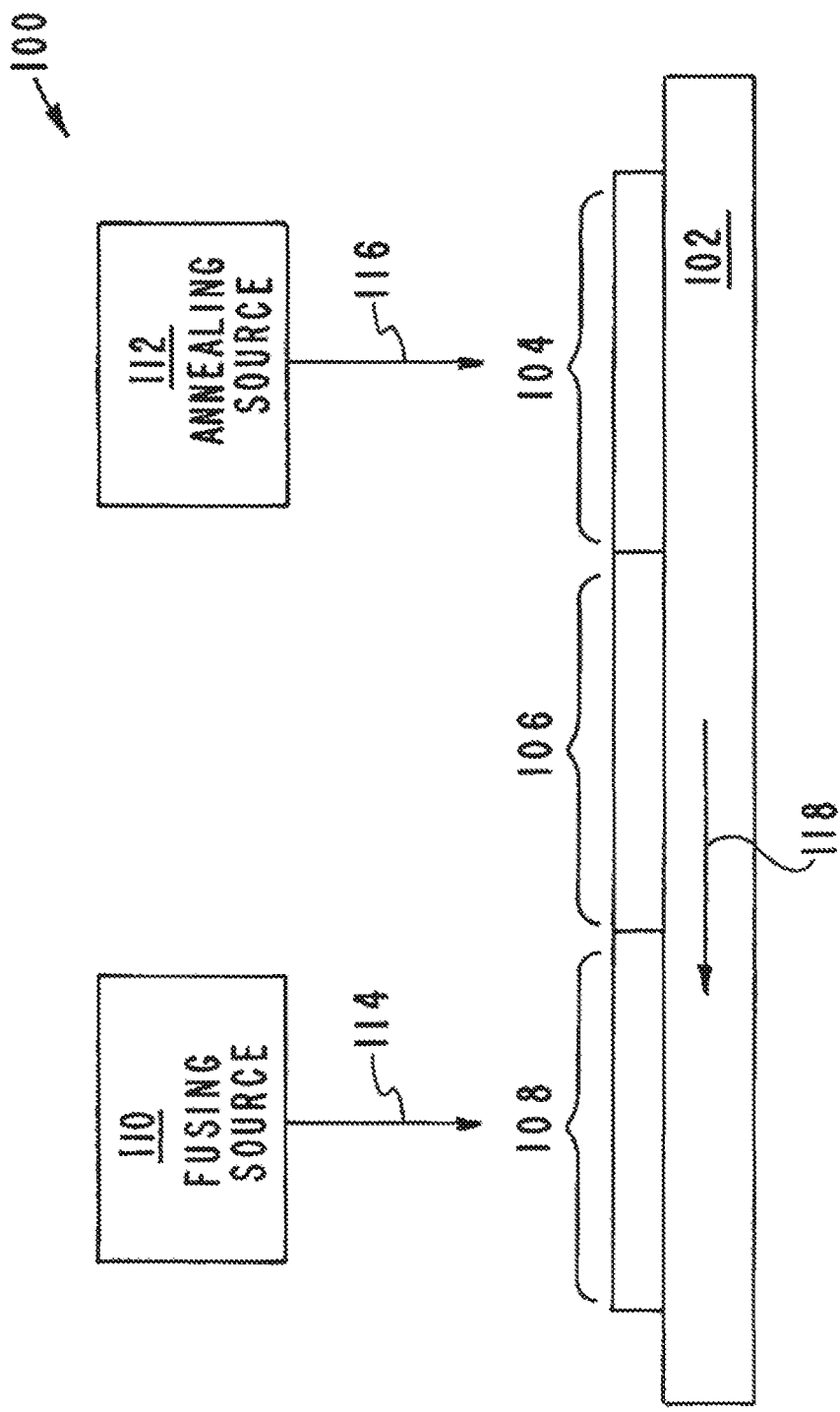

HEAT TREATMENT TO ANNEAL RESIDUAL STRESSES DURING ADDITIVE MANUFACTURING

CROSS-REFERENCE TO RELATED APPLICATIONS

This application is a divisional of and claims priority to U.S. patent application Ser. No. 15/008,989, filed on Jan. 28, 2016. The entire disclosure of the above application is incorporated herein by reference.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

FIELD OF ENDEAVOR

The present application relates to additive manufacturing and more particularly to heat treatment to anneal residual stresses during additive manufacturing.

BACKGROUND

This section provides background information related to the present disclosure which is not necessarily prior art.

U.S. Pat. No. 4,944,817 for multiple material systems for selective beam sintering issued Jul. 31, 1990 to David L. Bourell et al. and assigned to Board of Regents, The University of Texas System provides the state of technology information reproduced below.

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

U.S. Pat. No. 5,155,324 for a method for selective laser sintering with layer-wise cross-scanning issued Oct. 12, 1992 to Carl R, Deckard et al., University of Texas at Austin, provides the state of technology information reproduced below.

Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

SUMMARY

This section provides a general summary of the disclosure, and is not a comprehensive disclosure of its full scope or all of its features.

In one aspect the present disclosure relates to a method of producing a product through additive manufacturing with heat treatment. The method may comprise the steps of providing a substrate, positioning a layer of powder particles on the substrate producing an interface between the layer of powder particles and the substrate, and melting the powder particles with a fusing beam. The fusing beam may be impressed with a two dimensional pattern containing image information from a first layer to be printed. The fusing beam fuses the powder particles with the substrate in a desired shape and pattern producing fused powder particles. The method may further include heat treating the fused powder particles with a beam impressed with an additional two dimensional pattern. The additional two dimensional pattern may contain image information from the first layer to be printed to achieve heat treatment of the product. The heat treating may be completed prior to laying down additional new layers of material. The heat treatment may comprise an annealing operation implemented using the additional two dimensional pattern on at least one or more portions of one or more intermediate layers of the part. The method may further include providing a new layer of powdered material on top of said layer of fused powder particles subsequent to said heat treatment, and repeating the melting and heat treating operations in a layer-by-layer fashion using the two dimensional pattern and the additional two dimensional pattern, until the part is completed.

In another aspect the present disclosure relates to a method of producing a product through additive manufacturing with heat treatment. The method may comprise the steps of providing a substrate, positioning a layer of powder particles on the substrate producing an interface between said layer of powder particles and the substrate, and using a laser to melt the powder particles with a laser beam. The laser beam may be impressed with a two dimensional pattern containing image information from a first layer to be printed in making the product. The laser beam may be used to fuse the powder particles with the substrate in a desired shape and pattern producing fused powder particles. The method may further include heat treating the fused powder particles with an additional laser beam impressed with an additional two dimensional pattern containing additional image information to achieve heat treatment of the product, prior to laying down additional new layers of material. The heat treatment may comprise an annealing operation implemented using the additional two dimensional pattern.

In still another aspect the present disclosure relates to a method of producing a product through additive manufacturing with heat treatment. The method may include providing a substrate, positioning a layer of powder particles on the substrate producing an interface between said layer of powder particles and the substrate, and melting the powder particles. Melting of the powder particles may be accomplished with a first laser beam impressed with a two dimensional pattern containing image information from a first layer to be printed, to fuse the powder particles with the substrate and produce fused powder particles. The method may further include performing an annealing operation with a second laser beam impressed with an additional two dimensional pattern containing additional image information to achieve heat treatment of at least a portion of the first layer of the product, prior to laying down additional new layers of material. The method may further include performing a laser peening operation on at least a portion of the first layer of the product, then providing a new layer of powdered material on top of the first layer of fused powder particles subsequent to the heat treatment, and then repeating the melting, annealing and laser peening operations in a layer-by-layer fashion using the two dimensional pattern and the additional two dimensional pattern, until the part is completed.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

An embodiment of the inventor's apparatus, systems, and methods is illustrated in the single FIGURE of drawings.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Additive manufacturing, or 3D printing, is the process of turning digital designs into three-dimensional objects. It is a convenient and affordable way to make prototypes as well as finished products, making it popular with businesses, hobbyists and inventors. One of the technologies used by today's 3D printers is called selective laser sintering (SLS). SLS is a manufacturing technology that was created in the 1980s at The University of Texas at Austin. During SLS, tiny particles of plastic, ceramic or glass are fused together by heat from a high-power laser to form a solid, three-dimensional object. Another technology used by today's 3D printers is called selective laser melting (SLM). SLM is similar to SLS except that metal powder is used to form a three-dimensional product.

Like all methods of 3D printing, an object printed with an SLS or SLM machine starts as a computer-aided design (CAD) file. CAD files are converted to .STL format, which can be understood by a 3D printing apparatus. Objects printed with SLS or SLM are made with powder materials, most commonly plastics such as nylon in SLS, and metal powders in SLM, which are dispersed in a thin layer on top of the build platform inside an SLS or SLM machine. A laser, which is controlled by a computer that tells it what object to "print," is incident on the platform, tracing a cross-section of the object onto the powder.

Initially a 3D model of the desired product is designed by any suitable method, e.g., by bit mapping or by computer aided design (CAD) software at a PC/controller. The CAD model of the desired product is electronically sliced into series of 2-dimensional data files, i.e., 2D layers, each defining a planar cross section through the model of the desired product. The 2-dimensional data files are stored in a computer and provide a digital image of the final product.

The digital images are used in the additive manufacturing system to produce the final product. Solidified powder particles are applied to a substrate in a layer by layer process to produce the final product. The digital image of the first 2D layer is used to produce the first layer of the desired product.

A first embodiment of the inventor's apparatus, systems, and methods is illustrated in the drawing. This embodiment is designated generally by the reference numeral 100. A delivery system directs metal powder particles from a material build supply onto a substrate 102. A fusing light source 110 directs a projected beam 114 onto the layer of metal powder particles 104 that have been deposited on the substrate 102. The digital image of the first 2D layer is used to produce the first layer of the desired product. Relative movement between the projected beam 114 and the substrate 102 is indicated by the arrow 118.

The projected beam 114 containing the digital image of the first 2D layer is projected from the fusing light source 110 onto the layer of metal powder particles 104 that has been deposited on the substrate 102. The projected beam 114 solidifies the metal powder particles according to the digital image of the first 2D layer information producing the sintered layer 106.

The sintered layer 104 is heat treated to remove residual stress in the first and subsequent layers to improve the quality of the final product. Residual stresses are common in additive manufacturing due to localized heat deposition into the powder bed, and the cooling process that follows. Residual stresses can weaken the part being formed and cause changes in dimension while being formed, or afterwards. These stresses can cause internal cracking or yielding and present a serious problem in additive manufacturing technology.

The inventor's apparatus, systems, and methods utilize a secondary energy source 112 to peen or anneal residual stresses developed during the additive manufacturing process. A beam 116 is projected from the secondary energy source 112 onto the sintered layer 104 to remove residual stress in the sintered layer and produce the final layer 108. Relative movement between the beam 116 and the substrate 102 is indicated by the arrow 118.

Once the first layer 108 is completed, production of the second layer of the product is started. A second layer of metal powder particles is applied on top of the competed first layer 108. This procedure is continued by repeating the steps and building the final product in a layer by layer process. The inventor's apparatus, systems, and methods remove residual stresses in each layer as it is formed and/or through post processing though peening or annealing through the use of lasers, diodes, other forms of electromagnetic radiation, or other heat sources.

The inventor's apparatus, systems, and methods uses laser peening and thermal annealing technology in situ with the additive manufacturing process to anneal residual stresses and harden the structure of parts as they are being created. For Direct Metal Laser Sintering (DMLS) or Diode Additive Manufacturing (DiAM), these processes would be used intermediately between layer development (or in a post processing step) to ensure that the residual stresses in that layer(s) were eliminated. Through peening, layer hardening and uniform compressive stresses could be added internally to the part instead of just on the skin depth which is traditionally up to a couple millimeters. Upon part completion, peening and other thermal processes can be used to polish and smooth the rough and sometime "stair-stepped" edges that result from the layer by layer additive manufacturing process.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

What is claimed is:

1. A method of producing a product through additive manufacturing with heat treatment, the method comprising the steps of:

providing a substrate;

positioning a layer of powder particles on said substrate producing an interface between said layer of powder particles and said substrate;

melting said powder particles with a fusing beam impressed with a two dimensional pattern containing image information from a first layer to be printed, to fuse said powder particles with said substrate in a desired shape and pattern producing fused powder particles;

heat treating said fused powder particles with a beam impressed with an additional two dimensional pattern containing image information from the first layer to be printed to achieve heat treatment of the product, prior to laying down additional new layers of material;

wherein the heat treatment comprises an annealing operation implemented using the additional two dimensional pattern on at least one or more portions of one or more intermediate layers of the product;

providing a new layer of powdered material on top of said layer of fused powder particles subsequent to said heat treatment; and repeating said melting and heat treating operations in a layer-by-layer fashion using said two dimensional pattern and said additional two dimensional pattern, until the product is completed.

2. The method of claim 1, wherein heat treating said fused powder particles comprises using a laser to perform the heat treating.

3. The method of claim 1, wherein heat treating said fused powder particles comprises using a diode laser to perform the heat treating.

4. The method of claim 1, wherein heat treating said fused powder particles comprises using a source of electromagnetic radiation to perform the heat treating.

5. The method of claim 1, wherein heat treating said fused powder particles comprises using an electron beam to perform said heat treating.

6. The method of claim 1, further comprising performing a laser peening operation on said fused powder particles.

7. The method of claim 6, wherein the laser peening operation is performed using an additional laser.

8. A method of producing a product through additive manufacturing with heat treatment, the method comprising the steps of:
provide a substrate;
positioning a layer of powder particles on said substrate producing an interface between said layer of powder particles and said substrate;
using a laser to melt said powder particles with a laser beam impressed with a two dimensional pattern containing image information from a first layer to be printed in making the product, to fuse said powder particles with said substrate in a desired shape and pattern producing fused powder particles;
heat treating said fused powder particles with an additional laser beam impressed with an additional two dimensional pattern containing additional image information to achieve heat treatment of the product, prior to laying down additional new layers of material; and
wherein the heat treatment comprises an annealing operation implemented using the additional two dimensional pattern.

9. The method of claim 8, further comprising providing a new layer of powdered material on top of said layer of fused powder particles subsequent to said heat treatment.

10. The method of claim 9, further comprising repeating said melting and heat treating operations in a layer-by-layer fashion using said two dimensional pattern and said additional two dimensional pattern, until the part is completed.

11. The method of claim 8, wherein using a laser comprises using a diode laser.

12. The method of claim 8, wherein heat treating said fused powder particles comprises using a diode laser to perform the heat treating.

13. The method of claim 8, wherein heat treating said fused powder particles comprises using a source of electromagnetic radiation to perform the heat treating.

14. The method of claim 8, wherein heat treating said fused powder particles comprises using an electron beam to perform the heat treating.

15. The method of claim 8, further comprising performing a laser peening operation on said fused powder particles.

16. A method of producing a product through additive manufacturing with heat treatment, the method comprising the steps of:
providing a substrate;
positioning a layer of powder particles on said substrate producing an interface between said layer of powder particles and said substrate;
melting said powder particles with a first laser beam impressed with a two dimensional pattern containing image information from a first layer to be printed, to fuse said powder particles with said substrate and producing fused powder particles;
performing an annealing operation with a second laser beam impressed with an additional two dimensional pattern containing additional image information to achieve heat treatment of at least a portion of the first layer of the product, prior to laying down additional new layers of material;
performing a laser peening operation on at least a portion of the first layer of the product;
providing a new layer of powdered material on top of the first layer of fused powder particles subsequent to the heat treatment; and
repeating said melting, annealing and laser peening treating operations in a layer-by-layer fashion using said two dimensional pattern and said additional two dimensional pattern, until the product is completed.

17. The method of claim 16, wherein performing an annealing operation with a second laser beam comprises using a diode laser.

18. The method of claim 16, wherein performing an annealing operation with a second laser beam comprises using a diode laser.

19. The method of claim 16, wherein performing an annealing operation with a second laser beam comprises using a source of electromagnetic radiation.

20. The method of claim 16, wherein performing an annealing operation with a second laser beam comprises using an electron beam.

* * * * *